United States Patent

Nagami et al.

[11] Patent Number: 5,952,109
[45] Date of Patent: Sep. 14, 1999

[54] EDGE COMBINATION FOR BUTT WELDING BETWEEN PLATE MEMBERS WITH DIFFERENT THICKNESSES

[75] Inventors: Ikuo Nagami; Yuji Ogawa, both of Kanagawa-Ken, Japan

[73] Assignee: Nissan Motor Co., Ltd., Kanagawa, Japan

[21] Appl. No.: 08/791,431

[22] Filed: Jan. 27, 1997

[30] Foreign Application Priority Data

Jan. 30, 1996 [JP] Japan .................................... 8-014545

[51] Int. Cl.$^6$ .................................................. B23K 33/00
[52] U.S. Cl. .......................................... 428/599; 428/600
[58] Field of Search ................................... 428/596, 599, 428/600, 577, 579; 228/165, 166, 167, 168, 169

[56] References Cited

U.S. PATENT DOCUMENTS

| | | | |
|---|---|---|---|
| 3,068,827 | 12/1962 | Norcross | 228/165 |
| 3,195,229 | 7/1965 | Culver | 228/169 |
| 3,458,224 | 7/1969 | Freese | 228/165 |
| 4,068,436 | 1/1978 | Sato | 228/168 |
| 4,542,280 | 9/1985 | Simons | 228/165 |
| 4,625,904 | 12/1986 | Matsui et al. | 228/166 |

OTHER PUBLICATIONS

Recommended Proportions of Grooves for Arc Welding, Metal Progress, pp. 50–53, Apr. 1978.

Howard B. Cary, Modern Welding Technology, pp. 501–514, 516–517, no date.

*Primary Examiner*—John J. Zimmerman
*Attorney, Agent, or Firm*—McDermott, Will & Emery

[57] ABSTRACT

An edge prepared with a groove face leaving a vertical root face is combined with another edge prepared with an opposing groove face, a step for receiving a bottom of that edge to be welded thereto, and another step defined by a vertical abutment face for abutting on the root face and a horizontal flat surface, so that a weld groove is continuously defined by the groove faces and the flat surface.

5 Claims, 2 Drawing Sheets

EDGE COMBINATION FOR BUTT WELDING BETWEEN PLATE MEMBERS WITH DIFFERENT THICKNESSES

BACKGROUND OF THE INVENTION

1. Field of the Invention

The present invention generally relates to a weld joint groove, and particularly, to a combination of plate edges prepared with a weld groove for a butt welding between plate members different of thickness from each other.

2. Description of Relevant Art

FIG. 1A is a section of a two-piece aluminium road wheel fabricated by a conventional butt welding, and FIG. 1B is an enlarged section of a welded joint portion of the road wheel of FIG. 1A.

As shown in FIG. 1A, the road wheel is fabricated by joining a prepared (right) edge of a rim 100 as a thin plate member to a prepared (left) edge of a disc 101 as a thick plate member, by way of a circumferential MIG welding full-circled at both radially inner side and radially outer side. The edges in concern are brought into abutment as shown in FIG. 1B, where they define a right-angled corner for the inner circumferential welding and a conventional V-shaped groove for the outer circumferential welding.

In other words, at the thin plate side, the edge of rim 100 is prepared in a bevelling manner to form a (left) groove face. At the thick plate side, the edge of disc 101 is likewise bevelled to form a (right) opposing groove face and cut to define an intermediate corner, leaving a step 101a with a height equivalent to a thickness difference between the members 2 and 3.

Then, the step 101a of disc 101 having a ring-like configuration is pressure-fitted in the prepared edge of rim 100 having a ring-like configuration to constitute a conventional edge combination (FIG. 1B), before they are joined together by a MIG welding along a circumferential length of the V-shaped groove at the radially outer side (i.e. upper side in the figure) and by a MIG welding along a circumferential length of the right-angled corner at the radially inner side (i.e. lower side in the figure), applying a circumferential fillet weld at an arrowed oblique direction, like a lap joint.

However, the outer circumferential welding to the conventional V-shaped groove tends to have a shallow penetration of weld at the thick plate side (i.e. disc 101 side) of the V-groove, relative to a penetration at the thin plate side (i.e. rim 100 side), thus resulting in an extremely limited range of allowance in accuracy for an electrode to be positioned at an aiming angle to achieve a favorable penetration at the thick plate side.

Moreover, in the conventional edge combination, a groove face simply terminates on an abutment face so that an erroneous edge preparation directly results in an erroneous groove depth. If this depth is insufficient, a resultant lack of fusion may give rise to an insufficient joint strength.

It thus requires an extremely high accuracy in both electrode positioning and edge preparation for the conventional edge combination to achieve a sufficient penetration for a secured favorable joint strength.

SUMMARY OF THE INVENTION

The present invention has been achieved with such points in mind.

It therefore is an object of the present invention to provide an edge combination for a butt welding between edges of plate members different in thickness, permitting a relatively wide range of allowance in accuracy of electrode positioning, so that a desirable penetration of a constant depth can be achieved even when an electrode is erroneously set at a deviated aiming angle relative to a best position, if it falls within the wide accuracy range.

It is another object of the present invention to provide an edge combination for a butt welding between edges of plate members different in thickness, permitting a relatively wide range of allowance in accuracy of edge preparation.

To achieve the objects, according to a first aspect of the invention, there is provided an edge combination for a butt welding between a first edge of a first plate member with a first thickness and a second edge of a second plate member with a second thickness larger than the first thickness, the edge combination comprising: the first edge prepared with a first groove face, leaving a root face; the second edge prepared with a second groove face, a first step for receiving a bottom of the first edge, and a second step defined by an abutment face for abutting on the root face and a flat surface; and a groove defined by the first groove face, the second groove face, and the flat surface.

According to the first aspect of the invention, a plate edge at a thin plate side has a groove face, a root face and a bottom surface in succession, and a thick plate side plate edge has an opposing groove face, a second step and a first step in succession, so that a groove is defined by the respective groove faces and a flat surface of the second step, and a corner is defined by the bottom surface of the thin-plate side edge and an edge end face of the first step.

Therefore, the flat surface disposed at the thick plate side, where the weld has a less penetrating tendency due to a heat diffusion, permits a welding to aim at the flat surface for a sufficient welding heat to act on the thick plate side, where it is thus allowed to achieve an identical penetration depth to the thin plate side even when an aiming position of an electrode is deviated to some degree, in addition to that an improved visual aiming conveniency permits a facilitated electrode positioning, giving rise to an improved teaching efficiency in a robot welding.

Moreover, as the flat surface is interposed between a groove face and an abutment face at the thick plate side, the edge preparation has an increased range of allowance in accuracy of groove depth.

Further, a possible low setting of welding current and voltage permits a reduced power consumption, thus resulting in an extended service life of consumable parts such as an electrode tip.

According to a second aspect of the invention, as it depends from the first aspect, the first groove face and the second groove face are substantially straight so that the groove has a V-form.

Accordingly, the edge preparation is facilitated.

According to a third aspect of the invention, as it depends from the first aspect, the first groove face and the second groove face are substantially arcuate so that the groove has a U-form.

Accordingly, the visual aiming of welding has an increased conveniency, permitting the more facilitated electrode positioning.

According to a fourth aspect of the invention, as it depends from the first aspect, the first step has a height equivalent to a difference between the first thickness and the second thickness.

According to a fifth aspect of the invention, as it depends from the first or the fourth aspect, the abutment face has an identical height to the root face.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1A:
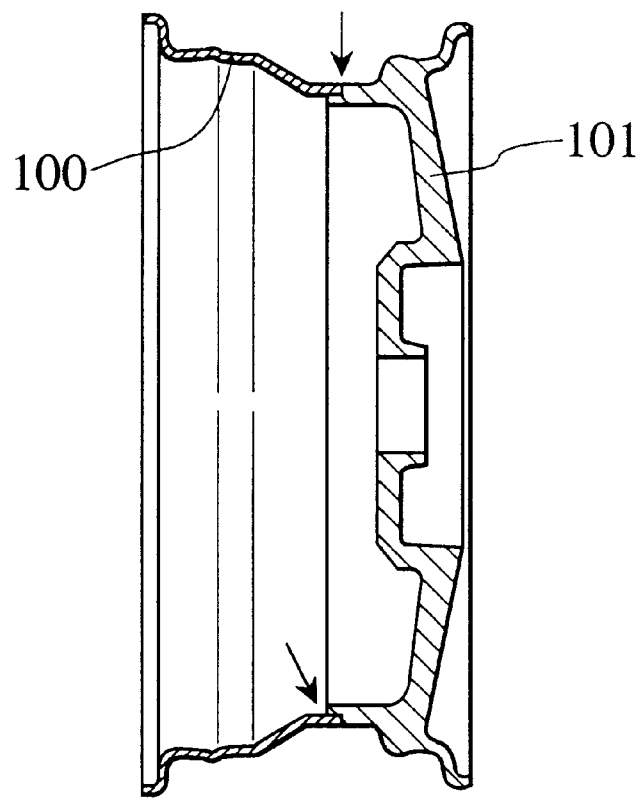
FIG. 1A is a section of a two-piece aluminium road wheel fabricated by a conventional butt welding.
Figure 1B:
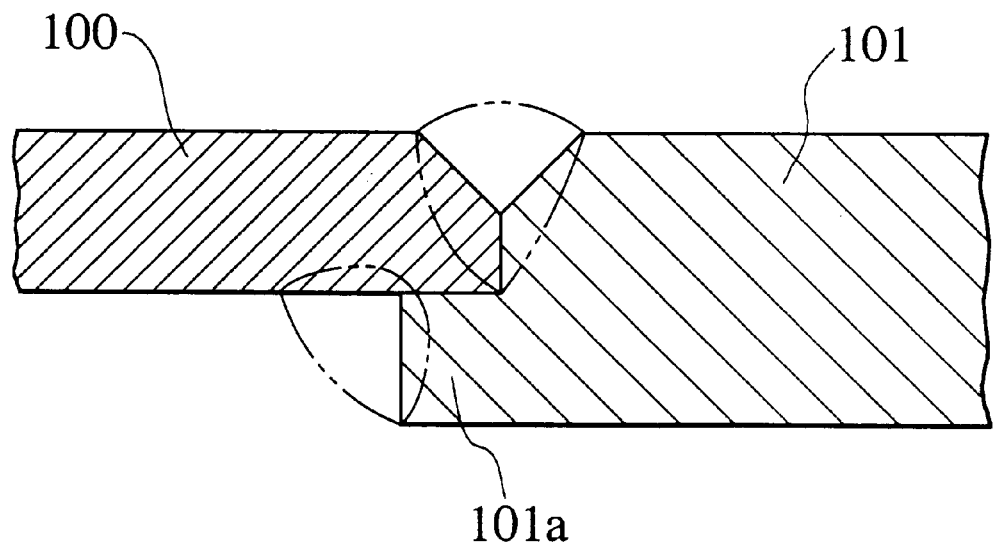
FIG. 1B is an enlarged section of a welded joint portion of the road wheel of FIG. 1A.

There will be detailed below the preferred embodiments of the present invention with reference to the accompanying drawings. Like members are designated by like reference characters.

Figure 2:
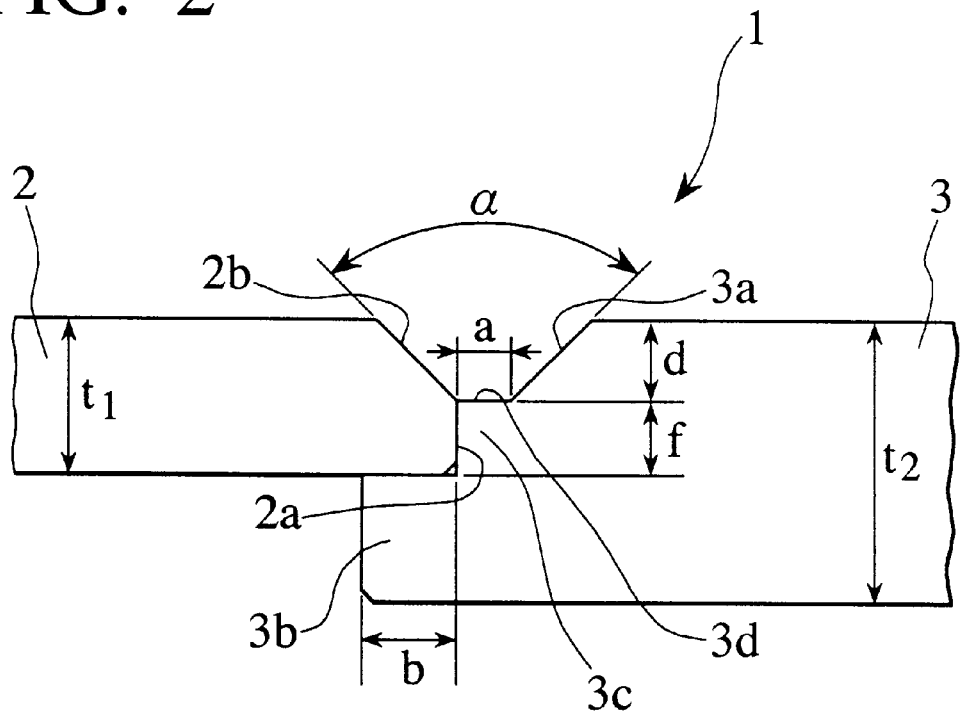
FIG. 2 is a section showing a shape of a weld joint groove according to a first embodiment of the invention.

FIG. 2 is a section showing a shape of a weld joint groove according to a first embodiment of the invention. In FIG. 2, designated at reference character 1 is the weld joint groove, which is applicable to a welding of such a two-piece aluminium road wheel that has a thin plate and a thick plate welded to be joined with each other, as shown in FIG. 1A. Observed at the thin plate side (left in FIG. 2) is part of a rim 2 as a plate member with a thickness $t_1$ of 5.5 mm. The rim 2 has an edge to be welded, which is prepared by cutting at an angle of 45°, leaving a root face 2a for abutment with a height f of 2.7 mm, to have a (left) groove face formed as a slope 2b, with a groove depth of 2.8 mm, at an upper side in the figure, i.e., at a radially outer side of a road wheel.

On the other hand, at the thick plate side (right in FIG. 2), there is part of a disc 3 as a plate member with a thickness $t_2$ of 10 mm, of which an edge to be welded is prepared into a configuration with a radially outer (right) groove face as a slope 3a, a radially inner first step 3b, and an intermediate second step 3c. More specifically, the slope 3a is formed as a cut at an angle of 45°, and the first step 3b is defined by combination of a vertical edge face with a height of 4.5 mm, which equals the thickness $t_2$ (10 mm) of member 3 minus the thickness $t_1$ (5.5 mm) of member 2, and a horizontal reception surface that extends with a width b (3.5 mm in this case) along a downside of the rim edge. Between the slope 3a and the first step 3b, there is observed the second step 3c that is defined by combination of a vertical abutment face with an equivalent height f to the root face 2a (2.7 mm high) of the rim 2 and a horizontal flat surface 3d with a width a of 2 mm. As the prepared edges of members 2 and 3 are brought into abutment on each other, the left and right groove faces as slopes 2b and 3a cooperate with each other to constitute a V-form groove with a groove angle α of 90° having a 2 mm-width bottom defined by the flat surface 3d.

In other words, as the disc 3 is fitted at the first step 3b of its prepared edge inside the prepared edge of the rim 2, the root face 2a of this member 2 abuts on the abutment face of the second step 3c of that member 3 so that they are positioned. The vertical edge face of the first step 3b cooperates with an exposed region of the bottom surface of the rim edge to define a right-angle corner for a fillet welding therebetween.

According to the first embodiment, two abutting plate members 2 and 3 integral with each other were rotated at a circumferential speed of 300 mm/min, when they were welded together along a circumference at the inner circumferential side by a TIG (tungsten inert-gas arc) welding with a 40°-inclined 1.2 mm-φ electrode equivalent to an A4043-WY prescribed in the JIS (Japanese Industrial Standard) Z3232, under a welding condition with a current of 340 A and a voltage of 17 V.

Then, with an electrode of the same kind in a downward adjusted position, the members 2 and 3 rotating at the same circumferential speed were welded together along a circumference at the outer circumferential side by a TIG welding under a welding condition with a current of 330 A and a voltage of 16 V.

After the welding, road wheels thus obtained were cut to have test pieces sampled for a macroscopic observation and a joint pulling destructive test of welded parts in concern, whereby their weld penetrations were observed of configuration and their joint tensile strength was examined. As a result, it was observed that the penetration was good at both radially inner and outer sides. It was shown in the pulling test that a parent metal rupture occurred at the thin plate (rim) side, with confirmation that a desirable joint strength is obtainable.

Figure 3:
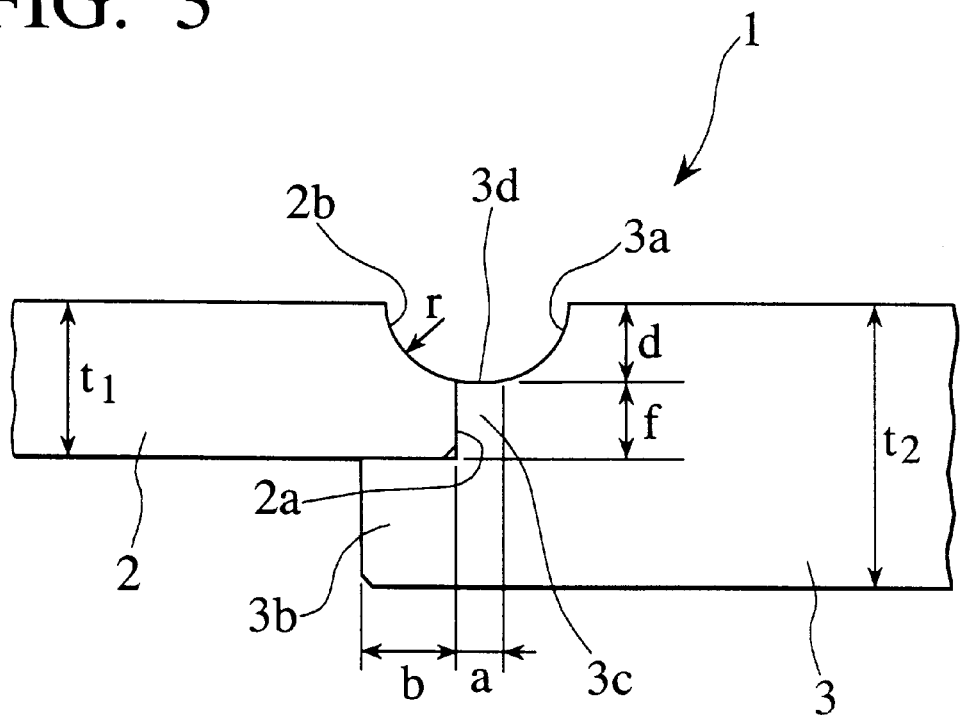
FIG. 3 is a section showing a shape of a weld joint groove according to a second embodiment of the invention.

FIG. 3 is a section showing a shape of a weld joint groove 1 according to a second embodiment of the invention. In the second embodiment, a right edge of a rim 2 as a thin plate member ($t_1$=5.5 mm) and a left edge of a disc 3 as a thick plate member ($t_2$=10 mm) are prepared to be joined together by a welding in a similar manner to the first embodiment, providing that the groove 1 of a depth d of 2.8 mm is substantially U-shaped with a radius r of curvature equivalent to 2.8 mm. Thus, at the rim 2 side, the edge to welded has a (left) arcuate groove face 2b and a root face 2a with a height f of 2.7 mm. At the disc 3 side, the edge to be welded has a (right) arcuate groove face 3a, a first step 3b defined by a vertical edge face with a height of 4.5 mm and a horizontal reception surface with a width b of 3.5 mm, and a second step 3c defined by a vertical abutment face with a height f of 2.7 mm and a horizontal flat surface 3d with a width a of 2 mm. As the prepared edges of members 2 and 3 are brought into abutment on each other, the left and right arcuate groove faces 2b and 3a cooperate with each other to constitute a U-form groove with a 2 mm-width bottom defined by the flat surface 3d.

According to the second embodiment, prepared ends of a rim 3 and a disc 3 were rotated at a circumferential speed of 300 mm/min, to be joined together by a TIG welding using an electrode of the same kind as the first embodiment in a corresponding manner, under a welding condition with a current of 340 A and a voltage of 17 V for the inner circumferential side, and with a current of 330 A and a voltage of 16 V for the outer circumferential side.

After the welding, road wheels thus obtained were cut to have test pieces sampled for a macroscopic observation and a joint pulling destructive test of welded parts in concern, whereby their observations and examinations were performed in a similar manner to the first embodiment. As a result, it was observed that the penetration was sufficiently favorable at both radially inner and outer sides. Moreover, it was shown in the pulling test that a parent metal rupture occurred at the thin plate (rim) side, with confirmation that a desirable joint strength is obtainable.

In the embodiments described, a weld joint groove according to the invention is applied to a circumferential butt welding of a two-piece aluminium road wheel. It will however be seen that a weld joint groove according to the invention may preferably be applied to other welding objects such as an iron-containing material and a magnesium alloy, as well as to aluminium-containing materials, or to other welding methods such as a flat plate welding.

While preferred embodiments of the present invention have been described using specific terms, such description is for illustrative purposes, and it is to be understood that changes and variations may be made without departing from the spirit or scope of the following claims.

What is claimed is:

1. An edge combination for a butt welding between a first edge of a first plate member with a first thickness and a second edge of a second plate member with a second thickness larger than the first thickness, the edge combination comprising:

the first edge prepared with a first groove face, leaving a root face;

the second edge prepared with a second groove face, a first step for receiving a bottom of the first edge, and a second step defined by an abutment face for abutting on the root face and a flat surface; and a groove defined by the first groove face, the second groove face, and the flat surface.

2. An edge combination according to claim 1, wherein the first groove face and the second groove face are substantially straight so that the groove has a V-form.

3. An edge combination according to claim 1, wherein the first groove face and the second groove face are substantially arcuate so that the groove has a U-form.

4. An edge combination according to claim 1, wherein the first step has a height equivalent to a difference between the first thickness and the second thickness.

5. An edge combination according to claim 1, wherein the abutment face has an identical height to the root face.

* * * * *